US011930828B2

(12) United States Patent
Zhang et al.

(10) Patent No.: US 11,930,828 B2
(45) Date of Patent: Mar. 19, 2024

(54) METHOD AND FORMULATION FOR GLUTEN-FREE BAKERY PRODUCTS

(71) Applicant: Rich Products Corporation, Buffalo, NY (US)

(72) Inventors: HuaXiao Zhang, Buffalo, NY (US); Paula Lugar, Buffalo, NY (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 15/941,279

(22) Filed: Mar. 30, 2018

(65) Prior Publication Data

US 2018/0220660 A1    Aug. 9, 2018

Related U.S. Application Data

(62) Division of application No. 12/505,913, filed on Jul. 20, 2009, now abandoned.

(60) Provisional application No. 61/082,033, filed on Jul. 18, 2008.

(51) Int. Cl.
*A21D 13/066* (2017.01)
*A21D 2/18* (2006.01)

(52) U.S. Cl.
CPC ........... *A21D 13/066* (2013.01); *A21D 2/183* (2013.01); *A21D 2/185* (2013.01)

(58) Field of Classification Search
None
See application file for complete search history.

(56) References Cited

U.S. PATENT DOCUMENTS

| | | | | | |
|---|---|---|---|---|---|
| 4,451,491 | A | * | 5/1984 | Trop | A21D 10/005 426/551 |
| 4,645,673 | A | * | 2/1987 | Wilmes | A21D 13/41 426/289 |
| 5,492,712 | A | * | 2/1996 | Silver | A23L 29/238 426/451 |
| 6,365,210 | B1 | * | 4/2002 | Schaible, II | A21C 11/006 426/549 |
| 2006/0210673 | A1 | * | 9/2006 | Petrofsky | A21D 2/16 426/94 |
| 2006/0222740 | A1 | * | 10/2006 | Kao | A21D 13/04 426/94 |
| 2007/0160728 | A1 | * | 7/2007 | Rudie | A21D 2/266 426/510 |
| 2008/0227173 | A1 | * | 9/2008 | Berg | A23L 33/18 435/202 |
| 2009/0092716 | A1 | * | 4/2009 | Atwell | A21D 8/06 426/233 |

FOREIGN PATENT DOCUMENTS

WO    WO 2007113678    * 10/2007

* cited by examiner

*Primary Examiner* — Lien T Tran
(74) *Attorney, Agent, or Firm* — Michael Best & Friedrich LLP

(57) ABSTRACT

Provided herein are gluten-free compositions which can be made into a dough. The gluten-free dough can be subjected to a sheeting or pressing process and therefore can be prepared easily in commercial settings. The dough comprises gluten-free flour, modified starch, protein, leavening agents; oil and water.

20 Claims, 1 Drawing Sheet

METHOD AND FORMULATION FOR GLUTEN-FREE BAKERY PRODUCTS

This application is a divisional application of U.S. application Ser. No. 12/505,913 filed Jul. 20, 2009 Now Abandon, which in turn claims priority to U.S. provisional application No. 61/082,033, filed on Jul. 18, 2008, the disclosure of which is incorporated herein by reference.

FIELD OF THE INVENTION

The present invention relates generally to gluten-free products and more particularly provides formulations and methods for making gluten-free doughs and gluten-free baked products.

BACKGROUND OF THE INVENTION

Celiac disease is an autoimmune disorder. It affects people of all ages. Recent findings estimate about 3 million people in the United States have celiac disease. When people with celiac disease eat foods or use products made from wheat (including spelt, triticale, and kamut), rye, and barley which contain gluten, the mucous membrane of the small intestine is damaged. Celiac disease affects people differently. Symptoms range from diarrhea or abdominal pain to irritability or depression.

The gluten protein content in the bakery foods made from traditional flour far exceeds the maximum amount of gluten that a celiac person can tolerate at the standard consumption level. Therefore, the current effective treatment for celiac disease is to follow a gluten-free diet. This means a person with celiac disease should not eat grains, bread, pizza, pasta, cereal, tortillas, and many other processed foods that contain gluten.

It is known that gluten protein contained in traditional flour is formed from two subunits: gliadin and glutenin. When mixed with water, the gluten protein forms a strong, cohesive dough that will retain gas during proofing and baking which imparts a light and foamy texture to the baked products. The viscoelastic property provided by gluten protein is fundamental in making bread, rolls, and pizza crust.

Gluten-free food items are still very limited. The commercially available gluten-free bakery products have a dense and crumbly texture, poor mouthfeel, unappealing appearance, and a short shelf life. Compared with the dough made from traditional flour, gluten-free doughs have very low cohesiveness, extensibility and elasticity; and poor gas retention. The available dough based methods produce sticky dough which is problematic in manufacturing and results in a poor quality products. As a consequence, most of the present processing methods in the marketplace for gluten-free pizza crust and bread production are batter-based. However, the batter based formulations are not suitable for manufacturing using traditional processing.

SUMMARY OF THE INVENTION

The present invention provides formulations and methods for producing gluten-free formulation mixes, doughs prepared from the mixes, and baked or par-baked products produced from the gluten-free doughs. In contrast to some existing gluten-free batter-based formulations in the market, the present formulations can be prepared into doughs. The doughs of the present invention are non-sticky meaning that the level of stickiness such that they can be subjected to sheeting and pressing steps. As a result conventional equipment of sheeting and pressing can be used for manufacturing of the dough products.

The formulations of the present invention comprise gluten-free flour. The formulation also comprises leavening agents (yeast and/or chemical leavening agents); modified starch, gums, protein, sweeteners, oil, emulsifiers, water; and optionally, gelatin, shortening, enzymes, spices, cheese, and/or flavors. The yeast and or chemical leavening agents are selected such that there is no leavening or minimal leavening during mixing, dividing/extruding, and sheeting/pressing process. Although the ingredients used in the present formulation are ones that are commonly used, based on what is known in the art, it was surprising that a dough could be formed from gluten-free flours and that such a dough would have the desired rheology and yet be non-sticky. It is believed that this was achieved by the particular combination of the selected ingredients and/or the method of making the dough.

The dough of the present invention can be prepared by a method comprising the steps of: 1) preparing dough by mixing the ingredients described herein; 2) shaping or extruding the dough to a desirable shape such as round dough balls or flat discs, sheeting or pressing (hot or cold pressing) the dough. The dough can then optionally be subjected to proofing in a proofer or resting at room temperature for 10-50 minutes. It is important that before proofing or resting the dough for par-baking, there should be no leavening or minimal leavening during mixing, shaping and sheeting/pressing.

Once the dough is formed, it can be directly frozen to make a frozen dough. The freezing can be done prior to proofing or par-baking. Alternatively, the dough can be used to make par-baked or fresh fully finished product. Both the par-baked and the fully finished baked products can also be frozen with or without baked or unbaked toppings. The baked products of the present invention have the appearance, aroma, and texture similar to those of conventional bakery products that are made from traditional gluten-containing flour.

The products made from the gluten-free dough of the present invention can include any type of baked product, but the dough is particularly useful for preparing products that require a sheeting/pressing process in commercial manufacturing. Such products include pizza crust and tortillas. Other products that can be made by the present formulations and methods include bread, flat bread, biscuits, rolls and the like.

BRIEF DESCRIPTION OF THE DRAWINGS

FIG. 1a) depicts round dough ball immediately after mixing and rounding,

FIG. 1b depicts slightly flattened dough ball; FIG. 1c) depicts final reduction of the dough with a thickness of 8 millimeters; FIG. 1d) depicts gluten-free pizza baked at impingement oven for 3.5 minutes.

DESCRIPTION OF THE INVENTION

Figure 1E:
FIG. 1e) depicts a baked tortilla
Figure 1E:
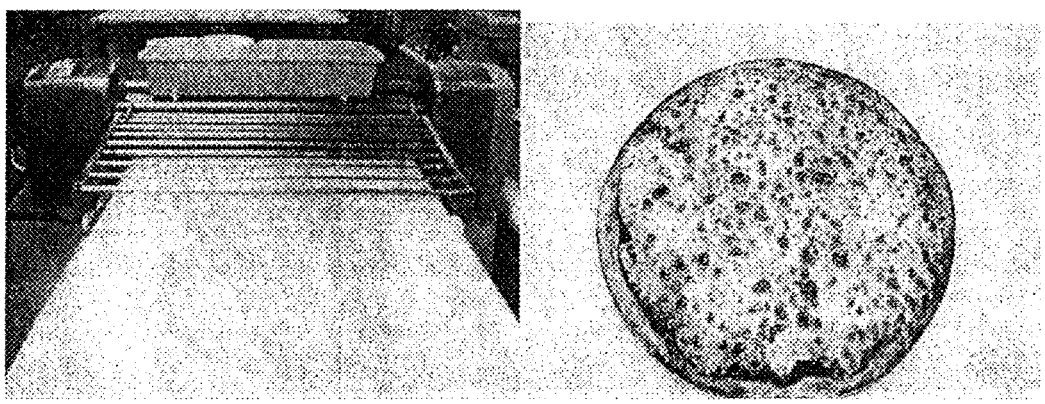
Figure 1E:
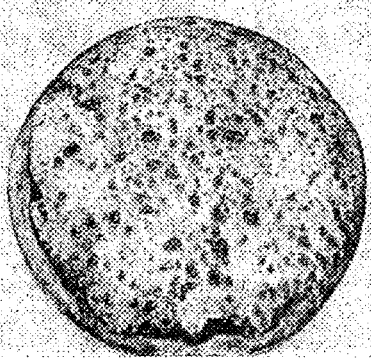
Figure 1E:
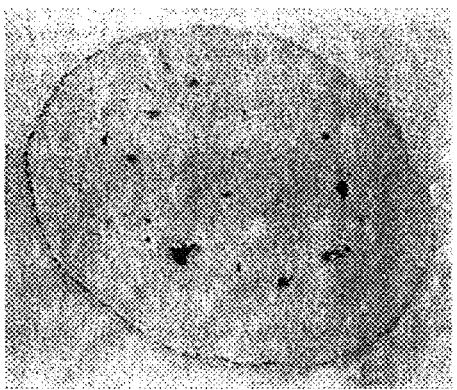

The present invention provides compositions for preparing gluten-free mixes, doughs and par-baked or baked products prepared from the doughs. Instead of using wheat flour, the present compositions comprise gluten-free flours. In one embodiment, the present composition is completely free of gluten. The formulation also comprises modified starches, protein from dairy sources (such as nonfat dry milk) or non-dairy sources (such as egg or vegetable), natural gums, leavening means, emulsifiers, and optionally gelatin, enzymes, sweeteners, and oils and shortening. The gluten-free products may also contain spices, flavoring agents, vitamins and other additives. It can also contain fiber ingredients and nutritional enrichments. Without intending to be bound by theory, it is believed that the particular amounts and combination of complex carbohydrates such as gums and modified starch provide sufficient strength such that the formulation can be made into a dough and further that the dough has desirable Theological properties and gas retention. As compared to other gluten-free products on the market, the gluten-free dough of the present invention has improved cohesiveness and a smooth surface which does not stick on the surface of the equipment during processing. Thus, the present doughs can be sheeted and pressed in bench or commercial settings.

The flours useful for the present invention include any flour which does not have gluten. For example, rice flour, tapioca flour, buckwheat flour, or combinations thereof. In one embodiment, the gluten-free flour comprises flour and/or starch derived from corn, rice, potato, teff, soy, sorghum, and buckwheat and combinations thereof. Alternatively or additionally, the gluten-free flour comprises flour and/or starch derived from potato, cassava, soy, pea, and beans. The gluten-free flour of the present contains no gluten proteins. In one embodiment, the formulation comprises flour or starch that is derived from naturally gluten-free raw sources, including gluten-free grains and tuberous roots (such as cassava root). The flour or starch can be a mixture of these different gluten-free flours. In another embodiment, the gluten-free dough further contains grain particles derived from rice, corn, sorghum and/or buckwheat.

In a dairy-based embodiment of the present invention, the proteins are milk proteins. If a non-dairy gluten-free dough is desired, egg proteins can be used in place of the milk proteins. Optionally, soy (or other vegetable) proteins can be used in either embodiment as an additional protein source.

The present formulation also comprises modified starches. The starch can be physically or chemically modified. Example of suitable non-gluten sources of starch include rice, corn, tapioca, potato and the like. Examples of modified starches from these or other non-gluten sources include pregelatinized starch, pregelatinized hydroxypropylated starch, cross-linked starch, etherified starch and oxidized starch.

The present formulation also comprises leavening means which can be yeast or chemical leavening agents or combinations thereof. The amount of yeast is 1 to 6 wt % of instant dry yeast (or equivalent amounts of other types of yeasts) and all integers and numbers to the tenth decimal place therebetween. In a preferred embodiment, the amount of yeast is 2-4 wt %. In various embodiments, the yeast can be 2.0, 2.5, 3.0, 3.5, 4.0 and all numbers to the tenth decimal point between consecutive recited numbers. Yeast can be purchased and used in different forms. The driest commonly used yeast, sometimes referred to as "instant" yeast, contains 3.5-6.0% moisture. Cream yeast contains about 80-85% moisture; compressed yeast contains about 66-73% moisture; and active dry yeast contains about 6-8% moisture. Other examples include baker's yeast, protected active dry yeast, frozen yeast and the like. Generally, instant yeast can be used. However, the invention is in no way limited to instant yeast. For a given quantity of instant yeast, one of ordinary skill in the art could easily determine the equivalent amounts of other forms of yeast. For example, 1% compressed yeast is equivalent to about 1.5-1.8% cream yeast, about 0.375-0.5% active dry, and about 0.3125-0.4% instant yeast.

Chemical leavening can be used alone as an alternative to yeast or can be used in combination with yeast. Chemical leavening system includes generally two groups of chemical agents that react to produce a gas that leavens the dough. The two groups of chemical agents are basic component such as baking soda, and acidic components (such as sodium acid phosphate (SAPP) or sodium aluminum phosphate (SALP)). The gaseous reaction will occur when the two groups of components come into contact with each other within dough, generally at least in part because one or both groups of the components dissolves in the liquid phase of the dough. It is preferable to use encapsulated chemical leavening agents to control the timing of the gaseous reaction so that no leavening due to the chemical leaveners occurs at room temperature such as during mixing, sheeting or pressing process. Further, with encapsulated chemical leaveners, no leavening would be expected to occur during storage of frozen dough. The encapsulated leavening agents typically comprise particulates of solid leavening agents coated with a barrier material such as fat or polymer that is solid at room temperature. The solid fat creates a barrier between the chemical leavening agent and the liquid component of the dough composition. The encapsulated leavening agents that are suitable for the current invention are preferably released at a temperature higher than 300° F. so that the encapsulated chemical leavening can only become effective during par-baking and baking. When present, the amount of chemical leaveners is between 0.1 to 1.5 wt %.

Combinations or yeast and chemical leavening can be used depending upon the desired product. For example, for bread rolls or pizza, yeast alone or yeast in combination with chemical leavening can be used. For flat thin products like tortillas and the like, only chemical leavening can be used. For making a gluten-free all natural product, only yeast is used.

The gluten-free dough of the present invention also comprises emulsifiers between 0.1% to 0.5% or higher as permissible under the FDA guidelines. Suitable emulsifier include mono-, di- or polyglycerides of fatty acids, lecithin, hydroxylated lecithin, calcium or sodium stearoyl lactylates (SSL) and diacetyl tartaric acid ester of monoglyceride ("DATEMS"), and/or mixtures thereof.

The gluten-free dough of the present invention also comprises one or more natural gums. The amount of the natural gums is between 0.2 to 5.0, as permissible under FDA guidelines. Suitable gums include gum acacia, carrageenan, guar gum, alginate and xanthan gum. In one embodiment, the only gums used are xanthan gum and guar gum, and no synthetic gum is used. In another embodiment, the gums are i) xanthan, ii) guar gum and iii) either gum arabic or semi-synthetic hydrophilic colloids. In another embodiment, the only gums used are guar gum, xanthan gum and gum arabic, and no synthetic gum is used. This combination of guar gum, xanthan gum and gum arabic is particularly suitable for all natural products. In another embodiment, the gum arabic is replaced with a synthetic hydrophilic colloid such as HPMC. Among these different gums, guar gum is critical to dough properties relating to the cohesiveness and surface smoothness of the dough and the quality of the par-baked or fully finished products. When the content of guar gum is less than 0.05%, the dough will tear during sheeting which will cause operational difficulties. Further, the par-baked or fully finished products will crack during baking or storage. The eating quality of the finished products is also significantly affected by the level of guar gum. The products are chewier with the increase of guar gum level. The guar gum content of the dough should be in the range of 0.05 to 1.5%. For easy processing and better product quality, the guar gum content should be in the range from 0.3 to 1.0%, preferably, 0.5 to 0.9%. Xanthan gum is important to dough strength. The content of xanthan gum should be in the range of 0.05 to 1.5%, preferably 0.3 to 0.6%. Gum arabic improves the surface smoothness of the dough and also improves the gas retention of the dough during proofing and baking. In one embodiment, gum arabic can be substituted with a semi-synthetic hydrophilic colloid. The content of gum arabic should be in the range of 0.05-1.2%, preferably 0.2 to 0.5%. In addition to gums, gelatin can also be present. No chewing gum base is needed or used in the present formulation.

The composition may further comprise semi-synthetic hydrophilic colloids such as methylcellulose, carboxy-methylcellulose, ethylcellulose, hydroxy-propylmethylcellulose (HPMC), and microcrystalline cellulose. If used, the semi-synthetic hydrophilic colloids should be 0.15 wt % or less.

Typically, a gum or combination of natural gums with or without the semi synthetic hydrophillic colloids is employed with a sugar, e.g., dextrose carrier.

The gluten-free dough of the present invention may include flavoring and/or coloring agents. The gluten-free dough may optionally contain suitable amounts of, for example, 0.01 to 3.0%, flavoring agents and/or coloring agents. When using flavorings, the amount of water and salt used in the dough may have to be adjusted to take into account, for example, the amount of salt and water already contained in the flavoring. It is believed that "fine tuning" of the amount of salt and water in the dough would be within the ability of one of ordinary skill in the art. Examples of suitable flavoring are cheese flavor, butter flavor, and yeast flavor. It will be appreciated by those skilled in the art that many different individual flavors can be used to achieve the ultimate desired flavor.

Vitamins and minerals may also be added to the dough as desired. Riboflavin is a vitamin commonly added to the dough. Vitamins and minerals may be added as enriched flour or added individually. In addition, calcium in absorbable or elemental form may also be added.

Sweeteners may be added to the gluten-free dough of the present invention to provide for texture and/or flavor. Sweeteners such as sugars may be added for the additional purpose of providing a source of energy for the yeast. In one embodiment, dextrose and/or other sugars such as sucrose, crystalline fructose, high fructose corn syrup (HFCS), or a combination of these sugars are used. Alternatively or additionally, artificial sweeteners such as aspartame, saccharine, sucralose, alitame, cyclamate, and the like may also be used.

In a preferred embodiment, the gluten-free dough of the present invention may also comprise enzymes. The enzymes may be selected from a group including, but not limited to, hemicellulase, xylanase, and the like. Determination of the amount and type of enzyme is well within the purview of those skilled in the art. Use of enzymes, such as hemicellulase, may be advantageous in improving dough machinability and product texture.

The amounts of various ingredients in the present formulation are shown are Table 1 below. While only the end values of the ranges for each ingredient are identified, the composition can have any of the individual values to the tenth decimal place which fall within the recited ranges. Thus, if a range of 35 to 60 wt % is recited, all integers between 35 and 60 (such as 36, 37 . . . 40, 41, 55, 56, 68, 69) are intended to be recited as well as values to the tenth decimal place between each consecutive pair of integers. Again, as an example, if a range of 0.3 to 1.5 is recited all values to the tenth decimal place from 0.3 to 1.5 (such as 0.4, 0.5, . . . 1.0, 1.1, . . . 1.4) are intended to be recited:

TABLE 1

| Ingredient | range (wt %) | preferred range (wt %) |
| --- | --- | --- |
| gluten-free flour | 35 to 65 | 45 to 55 |
| instant yeast (when present) | 1 to 6 | 2 to 4 |
| chemical leavener (when present) | 0.1 to 1.5 | 0.5 to 1.2 |
| natural gums | 0.2 to 2.5 | 0.9 to 2.0 |
| modified starch | 1 to 5 | 2 to 3 |
| proteins (dairy, veg. and/or egg) | 2 to 20 | 3 to 10 |
| Sweetener | 1 to 8 | 3 to 7 |
| vegetable oil | 1 to 15 | 4 to 8 |
| Shortening (when present) | 1 to 15 | 3 to 10 |
| Water | 30 to 55 | 35 to 45 |

In one embodiment, the amounts of various ingredients are as follows: 35 to 65 weight percent gluten-free flour, from 1 to 6 weight percent of instant dry yeast, from 30 to 55 weight percent water, from 0.1 to 1.5 weight percent of an encapsulated baking powder. Other dough ingredients are present in a weight percent of: 0.2 to 5.0% of gums, 0.0 to 5.0% of gelatin, 2 to about 10% of milk proteins and/or 2 to 10% of egg proteins, 1 to 8% of sugar (or any other suitable sweetener, including corn syrup), 1 to 3% of salt, 1 to 15% olive oil (or any other suitable oil, including vegetable and canola oil), 1 to 15% of shortening, 0 to 15% (e.g. 1%, 5%, 10%) of cheese, natural flavors, and herbs. The percent of egg proteins and milk is presented for the dry form. Both egg protein and milk protein can be used or just one of these two can be used. The liquid form can be used and the amount should be converted to their dry forms.

The products made from the gluten-free dough of the present invention can include bread, flat bread, tortillas, taco shell, biscuits, rolls, and pizza crust.

The present invention also provides a dry mix for making gluten-free products. The mix comprises gluten-free flour, leavening means (yeast and/or chemical leavening agents), modified starch, proteins, gums and emulsifiers. The dry mix can be used by an end user to make gluten-free dough and baked or par-baked products. The ranges of the various ingredients in the gluten-free dry mix are as follows: 70 to 85 wt % gluten free flour; leavening agents 1 to 7 wt % yeast and/or 0.3 to 2.0 wt % chemical leavener; 1 to 5 wt % modified starch; 0.08 to 1.8 wt % guar gum; 0.08 to 2.0 wt % of xanthan gum; 0.05 to 1.8 wt % of gum Arabic or semi-synthetic hydrophilic colloids; 3 to 20 wt % proteins; 0.05-1.2 wt % emulsifiers and 2 to 10 wt % sweeteners. In one embodiment, the dry mix consists essentially of the above ingredients. The dry mix may also contain 1 to 2 wt % salt, emulsifiers and other nutritive (vitamins etc.) or flavoring ingredients. A dough can be prepared from the dry mix by the addition of water with or without oil. While any baked product can be made from the dough, because the dough is non-sticky, it can be subjected to a commercial sheeting or pressing process or to any type of rolling or flattening process to make flat thin products.

The invention also provides a method for making the gluten-free products. The method comprises the steps of: 1) preparing a dough by using a straight dough method in which all of the ingredients are combined together. The combining step may include either combining all of the ingredients at once or combining different combinations of ingredients first and then combining all of the ingredients together. For example, according to one embodiment, certain of the ingredients are combined to form a pre-mix, including for example, the salt, gums, enzymes, chemical leavening agents and/or other minor ingredients. Then, the pre-mix is combined with the remaining ingredients including the gluten-free flour, starch, yeast, water, lipids and protein sources. The pre-mix and/or the final mixture may include one or more additional ingredients as set forth herein. According to a preferred embodiment of the present invention, the combining step includes mixing all the ingredients. After combining, the ingredients are mixed (or further mixed if mixing steps have already taken place) by any suitable mixing apparatus, such as a Hobart mixer to a desirable consistency. It is important to control the dough temperature to a range of 60–80° F., preferably less than 75° F. so as to minimize or eliminate leavening; 2) immediately dividing the dough into proportional size and pre-shaping the dough to a desirable shape such as round dough balls 3) for pizza, tortilla or similar products, sheeting/pressing the dough; 4) if the formulation contains yeast and proofing is desired, proofing the dough or giving floor time to allow the dough to rise for preparing par-baked or fully finished products; and 5) baking the dough at certain conditions to produce the par-baked or fully finished products. The process used in the current invention is similar to the traditional processing method, but with a relatively shorter mixing time because there is no gluten development involved during mixing and no resting is required as in traditional bread-making. Thus, there is no time needed for relaxing of the dough or resting of the dough.

It is important that before proofing or resting the dough there should be no leavening or minimal leavening. Minimum leavening as used herein means that the specific volume should be less than 1.2 (or that it does not increase by more than 20%), preferably less than 1.15 and more preferably it should be 1.1 or less. Thus, in some embodiments, the specific volume after the mixing and sheeting/pressing step is 1.1, 1.09, 1.08, 1.07, 1.06, 1.05, 1.04, 1.03, 1.03, 1.02, 1.01, 1.0, 0.99, 0.98, 0.98, 0.97, 0.96, 0.95, 0.94, 0.93, 0.92, 0.91 or 0.90. In some embodiments, the specific volume increases by less than 10, 9, 8, 7, 6, 5, 4, 3, 2, or 1%. It may even sometimes decrease.

The specific volume of the dough after mixing is generally about 1.0. In one embodiment, it was between 0.9 and 1.0. After the sheeting process, it is preferably less than 1.1. It is important to keep the dough temperature in the range of 60 to 80° F., preferably less than 75° F. and to process the dough immediately after mixing. This is because it was observed that if the dough was allowed to leaven during the sheeting/pressing and molding process, the frozen dough and the par-baked product were of inferior quality. In particular, the par-baked product was observed to develop some cracks if the dough leavened to a specific volume of 1.2 during the sheeting or molding process. If the dough leavened to a specific volume of 1.3 or more, the cracks were significant in the par-baked product. The term "immediately" as used herein means that there are no intervening steps between the mixing and the sheeting/pressing steps, and therefore, the time taken between the completion of formation of dough after mixing to the start of sheeting/processing step is less than one minute.

Provided herein are some examples of preparation of the flat dough products. After mixing of the ingredients, a dough ball is made which is then flattened. The flattened dough is subjected to one or more additional flattening steps to produce the desired final thickness (such as a thickness of 4 to 16 millimeters). Examples of such steps include, but are not limited to, sheeting and pressing (hot or cold). The dough can then be cut and processed for par-baking and/or baking. For example, a gluten-free pizza product can be baked in an impingement oven 420° F. for 3 to 4 minutes.

In another example, a round dough ball is obtained as above and placed on a parchment paper and sprayed on top with oil. The dough can then be pressed to desired thickness (such as 4 to 16 mm) and after docking, can be baked in an impingement oven 420° F. for 3.5 minutes. The oil spray and parchment paper can be eliminated by controlling the surface temperature of the hot press. Typically, the surface temperature can have a range from 120 to 480° F.

In another example, an extruding-press process can be used. For example, after mixing and forming the dough, the dough can be extruded to obtain desired shape. The extruded dough can be pressed to obtain desired thickness/diameter. The surface temperature of the hot press ranges from 120 to 480° F. The pressed dough can then be transferred from the hot press to the rack. Par-baked or fully baked tortilla can be obtained by applying 420° F. for 4 minutes with 50 seconds steam at the beginning of baking.

The gluten-free dough of the present invention has a better viscoelastic property. For example, in a TA.XT2 Texture Analyzer, it was observed that a strip of 2×60 mm could be stretched up to 50 mm.

The process used in the current invention is similar to the traditional processing method, but with a shorter processing time. The gluten-free dough has a better cohesiveness and smooth surface which does not stick on the surface of the equipment during processing.

In making the gluten-free products, the equipment, processing line, and materials (packaging, storage facilities) should preferably not come in contact with gluten containing crops or materials.

Because the present process used in the current invention is a dough-based method rather than a batter-based method, conventional equipment can be used for the preparation of the dough or par-baked products. Thus, no special equipment such as that required for batter-based formulations, is required for the present formulations. The gluten-free dough of the present invention is easy to handle and produces a product having similar quality to traditionally produced wheat doughs. Particularly, the gluten-free dough produced from the current invention has a better cohesiveness than previous gluten-free doughs and has a smooth surface which does not stick on the surface of the equipment during processing.

Products made from the current invention have a constant quality, desirable texture, desirable flavor and taste that is similar to traditional bakery products made with wheat flour. Particularly, the pizza crust has a crispy exterior and soft interior. In addition to desirable taste, the products contain well-balanced nutrients.

In one embodiment of preparing a dough product (such as pizza crust), a sheeting process is used. The sheeting process comprises sequentially the following steps: 1) blending all the dry ingredients in a horizontal or vertical mixer to uniformity; 2) mixing the dry blend with liquid ingredients including water to obtain a cohesive dough with gentle mixing; the dough temperature is controlled by the water temperature to a desirable range of 60–80° F.; 3) the dough ball is sheeted to a desirable thickness with a gradual reduction in thickness; and 4) the sheeted dough is docked and then cut to a desired size.

In another embodiment of preparing a dough (such as pizza crust), a press process is used. The press process comprises the steps of: 1) separating the gluten-free dough into individual (8 to 10 ounce) balls by a machine; 2) lightly coating vegetable oil onto the dough ball by spraying the oil onto the dough ball; 3) placing the dough ball onto a aluminum pan or the bottom plate of the press which is either sprayed with a thin layer of oil or covered with a parchment paper; and 4) lowering the top plate of the press and holding the press down until the dough ball has assumed a uniform thickness with spreading out radially. The plate temperature is preferably from 120° F. to 480° F. and the dough surface after pressing is preferably between 100-140° F.

The sheeted pizza dough can be frozen by methods known in the art and stored at a temperature in a range of from about −42° F. to about −10° F., more preferably at a temperature in the range of from about −20° F. to about −12° F. The sheeted gluten-free pizza frozen by these methods can be stored for up to about 120 days.

The sheeted or pressed gluten-free pizza dough can also be par-baked by the methods known in the art. It is expected that the par-baked dough can be stored for up to 240 days.

Processing for par-baked gluten-free pizza crust comprises sequentially the following steps: 1) proofing the sheeted or pressed gluten-free pizza dough for about 10 to 30 minutes at a relative humidity of 85%, and a temperature of about 95° F. or placing at ambient temperature for a period of 10 to 50 minutes; 2) par-baking the proofed pizza dough at 350° F. to 500° F. for a period of time from 2.5 to 6.0 minutes; preferably par-baking at a temperature of 420° F. for 3.5 to 5.0 minutes with steam depending on dough size and the thickness of the sheeted gluten-free dough.

The par-baked gluten-free pizza crust preferably increases from 20 to 100 percent after being par-baked. The thickness of the crust is generally between 4 to 16 mm.

The par-baked gluten-free pizza crust can be frozen by methods known in the art after cooling and can then be stored. The par-baked dough can be stored for up to 270 days.

The present invention will now be described in detail for specific embodiments of the invention. It is to be understood that these embodiments are intended only as illustrative examples and the invention is not to be limited thereto. All percentages are provided as weight percentages unless indicated otherwise.

Example 1

This example provides a gluten-free formulation for the dough of the present invention as shown in Table 2.

TABLE 2

| Ingredient | Wt. % |
|---|---|
| Rice flour | 31.10 |
| Water | 31.10 |
| Topioca flour | 20.74 |
| High fructose corn syrup | 3.11 |
| Vegetable oil | 2.59 |
| Non transfat shortening | 1.56 |
| Non-fat milk | 1.56 |
| Instant yeast | 1.14 |
| Modified starch | 1.04 |
| Whole egg (dried) | 1.04 |
| Salt | 1.04 |
| Seasoning | 0.78 |
| Egg white | 0.52 |

TABLE 2-continued

| Ingredient | Wt. % |
|---|---|
| Gelatin | 0.52 |
| Cheese | 0.52 |
| Baking powder | 0.52 |
| Flax seed flour | 0.26 |
| Gum Arabic | 0.26 |
| Lecithin | 0.16 |
| Guar gum | 0.16 |
| Xanthan gum | 0.16 |
| sodium stearoyl lactylates (SSL) | 0.16 |
| Total | 100.04 |

Example 2

This example provides a gluten-free formulation for the dough of the present invention. This embodiment is a non-dairy formulation (Table 3).

TABLE 3

| Ingredient | Wt. % |
|---|---|
| Rice flour | 30.20 |
| Water | 30.20 |
| Topioca flour | 20.13 |
| Potato starch | 5.03 |
| Vegetable oil | 3.02 |
| Non transfat shortening | 2.52 |
| Sugar | 2.52 |
| Instant yeast | 1.26 |
| Whole egg | 1.01 |
| Salt | 1.01 |
| Baking powder | 0.50 |
| Egg white | 0.50 |
| Gelatin | 0.50 |
| Soy flour | 0.50 |
| Lecithan | 0.30 |
| Xanthan gum | 0.30 |
| Gum Arabic | 0.25 |
| Guar gum | 0.25 |
| Xylanase | 0.015 |
| Total | 100.015 |

Example 3

This example provides a gluten-free formulation for the dough of the present invention. This embodiment is an all-natural, non-dairy formulation (Table 4). Therefore, the composition does not have any non-natural products or diary protein or chemical leavening or semi-synthetic hydrophilic colloids or non-natural emulsifiers.

TABLE 4

| Ingredient | Wt. % |
|---|---|
| Water | 34.29 |
| Rice flour | 30.71 |
| Topioca flour | 20.47 |
| Olive oil | 3.07 |
| Potato starch | 2.56 |
| Sugar | 2.56 |
| Instant yeast | 1.13 |
| Salt | 1.02 |
| Whole egg | 1.02 |
| Egg white | 1.02 |
| Gelatin | 0.51 |
| All natural cheese flavoring | 0.51 |
| Xanthan gum | 0.31 |

TABLE 4-continued

| Ingredient | Wt. % |
| --- | --- |
| Lecithan | 0.31 |
| Gum Arabic | 0.26 |
| Guar gum | 0.26 |
| Xylanase | 0.015 |
| Total | 100.025 |

Example 4

This example describes the properties of the dough of the present invention evaluated according to the method of Suchy et al. (2000; Cereal Chem. 77(1):39-43). The dough as prepared in Example 1, was rounded gently into a ball and placed over three to four channels of the Teflon-coated block that had been prepared by placing thin nonadhesive Teflon strips (2×60 mm) coated in mineral oil in the channels. The upper half of the block was placed in position and tightly clamped, which distributed the dough over three to four channels to yield an equivalent number of dough strips of uniform geometry. The individual dough strips were then separated from the Teflon strips, positioned across the Kieffer rig dough holder, and immediately tested on a TA at the hook speed of 3.3 mm/sec and a trigger force of 1 g. All measurements obtained with three independent samples from one batch were average of two replicate values. Results are shown in Table 5.

Firmness was measured with a texture analyzer (TA-XT2 Stable Micro Systems). Dough was compressed with a cylinder. Compression range was 50% and the compression rate was 2 mm/sec. When the dough was compressed from 0 to 50%, the force as a function of time was recorded. The maximum force was taken as the firmness. Extensibility was measured with the same texture analyzer. Extensibility (E) is the distance from start until dough rupture. Maximum resistance to deformation (Rmax) is the force of dough rupture. These data demonstrate that the present formulations can be made into a dough having rheological properties similar to traditional wheat flour doughs that are required for baking.

TABLE 5

| Measurement* | Firmness** (g) | Extensibility*** | |
| --- | --- | --- | --- |
| | | R Max (g) | E (mm) |
| Sheeted dough (raw) | 197.3 ± 18 | 11.8 ± 3.4 | 15.0 ± 3.1 |
| Freshly Par-bakes crust | 1182.7 ± 100 | | |
| Par-baked crust Frozen storage (60 days) | 1390 ± 83 | | |

Example 5

This example describes the textural properties of a par-baked pizza crust obtained from the dough of current invention. Samples were taken from par-baked pizza crust one day after baking. The thickness of the crust was 8.0 mm. All measurements obtained with three independent samples from one batch were average of two replicate values. The texture profile analysis (TPA) was performed using a Texture Analyzer (TA.XT2, Texture Technologies Corp.) equipped with a 25-kg load cell and a 35-mm cylindrical probe. The settings used were a test speed of 2.0 mm/sec with a trigger fore of 20 g to compress the middle of the sample to 40% of its original height. Results are shown in Table 6.

TABLE 6

| Parameters | Hardness | Springiness | Cohesiveness | Gumminess | Chewiness | Resilience |
| --- | --- | --- | --- | --- | --- | --- |
| Value | 6113.2 ± 1038 | 0.86 ± 0.04 | 0.58 ± 0.03 | 3458.4 ± 432 | 2965.2 ± 346 | 0.21 ± 0.03 |

The physical properties of the Gluten-free pizza dough and Par-baked Pizza crust which were obtained from the dough of current invention are shown in Table 7. Crust and crumb color was determined with a Chromameter (CR-300, Minolta Osaka, Japan.

TABLE 7

| Sample ID | Thickness (mm) | % of rise | Crumb color** | | |
| --- | --- | --- | --- | --- | --- |
| | | | L* | a± | b± |
| Sheeted raw dough | 6.7 ± 0.15 | | 86.12 ± 1.0 | 1.37 ± 0.27 | 15.05 ± 0.32 |
| Par-baked pizza crust | 8.5 ± 0.14 | 26.8% | 79.70 ± 1.9 | 0.68 ± 0.12 | 15.73 ± 0.38 |

L* The lightness value indicates how light or dark the color is (0 = black, 100 = white)

a± The a* value is the position on the red-green axis (−a* = green, +a* = redness).

b± The b* value is the position on the yellow-blue axis (−b* = blueness, +b* = Yellowness)

Example 6

In this example, a comparative analysis was carried out between the present dough (from Example 1) and a gluten-free composition prepared as described in Ahlbom et al. 2005 (Cereal Chem., 82(3): 328-335). The comparative formulation contained 50.8% flour; 1.1% active dry yeast; 0.8% xanthan gum; 2% non-fat dry milk; 8.8% eggs; 4% sweetener; and 28.7% water. The total water, taking into consideration water from whole eggs, is approximately 36-37%. The comparative formulation had only xanthan gum, had no modified starch and no chemical leaveners. Both doughs were then tested for their stickiness. Dough stickiness and adhesion properties were measured by using a TX.T2 Texture analyzer (TA.XT2, Texture Technologies Corp.) following the procedure developed by Chen and Honesey (1995; Lebensm Wiss Technol 18:467-473). Dough stickiness and adhesiveness measure the force required to release the probe from the dough and Cohesiveness/dough strength is a measure of the strength of the internal bonds making up the body of the dough. The results are shown in Table 8.

TABLE 8

| Sample | Stickiness (g) | Adhesion (g × second) | Dough Strength/ Cohesiveness (mm) |
|---|---|---|---|
| Gluten-free present dough invention | 9.65 ± 2.1 | 0.22 ± 0.007 | 0.28 ± 0.007 |
| Gluten-free comparative formulation | 15.64 ± 2.0 | 0.33 ± 0.03 | 0.27 ± 0.01 |

These data indicate that the present formulation has reduced stickiness and adhesion as compared to the comparative formulation. Thus, the present dough is particularly suitable for use in processes which involve sheeting/pressing.

While this invention has been described through specific embodiments, routine modifications to the formulations and methods described herein based on the present disclosure, are intended to the within the scope of this invention.

The invention claimed is:

1. A method of preparing gluten-free dough product comprising the steps of:
   i) mixing together gluten-free flour, leavening agent, modified starch, water, protein, emulsifier, shortening and/or oil, and gum to form a gluten-free dough;
   said gluten-free flour constituting at least 35 wt. % of said gluten-free dough;
   said leavening agent selected from the group consisting of yeast, chemical leavener, and a combination thereof; said leavening agent constituting at least 1.1 wt. % of said gluten-free dough;
   said modified starch constituting at least 1 wt. % of said gluten-free dough;
   said water constituting at least 30 wt. % of said gluten-free dough;
   said protein constituting at least 2 wt. % of said gluten-free dough;
   said emulsifier constituting at least 0.1 wt. % of said gluten-free dough;
   said shortening and/or oil constituting at least 1 wt. % of said gluten-free dough;
   said gum constituting 0.8 wt. % to 4.2 wt. % of said gluten-free dough and including guar gum constituting 0.3 wt. % to 1.5 wt. % of said gluten-free dough;
   xanthan gum constituting 0.3 wt. % to 1.5 wt. % of said gluten-free dough; and
   gum Arabic constituting 0.2 wt. % to 1.2 wt. % of said gluten-free dough; and,
   ii) dividing and shaping said gluten-free dough under conditions such that an increase in specific volume is less than 20% to form said gluten-free dough product, wherein said gluten-free dough product is a pizza dough, a tortilla dough, or a flatbread dough.

2. The method as defined in claim 1, wherein a temperature of said gluten-free dough during said step of mixing is no more than 80° F.

3. The method as defined in claim 1, wherein a temperature of said gluten-free dough during said step of dividing and shaping is no more than 80° F.

4. The method as defined in claim 1, further including the step of sheeting and pressing the gluten-free dough product, a temperature of said gluten-free dough during said step of sheeting or pressing is no more than 80° F.

5. The method as defined in claim 1, further including the step of sheeting and pressing the gluten-free dough product, wherein said step of pressing includes first extruding said gluten-free dough and then subjecting said gluten-free dough to a hot press that has a temperature of at least 120° F.

6. The method as defined in claim 5, wherein a temperature of an outer surface of said gluten-free dough after said step of pressing is at least 100° F.

7. The method as defined in claim 4, further including the step of freezing said gluten-free dough product after said step of sheeting or pressing.

8. The method as defined in claim 4, further including the step of par-baking said gluten-free dough product after said step of sheeting or pressing and then freezing said par-baked gluten-free dough product.

9. The method as defined in claim 8, wherein said par-baked gluten-free dough product is frozen for up to 270 days.

10. The method as defined in claim 1, wherein said gluten-free dough includes
    35-65 wt. % of said gluten-free flour;
    1.1-7.5 wt. % of said leavening agent;
    1-5 wt. % of said modified starch;
    30-55 wt. % of said water;
    2-20 wt. % of said protein;
    0.1-0.5 wt. % of said emulsifier;
    1-30 wt. % of said oil and/or shortening; and
    said gum including
        guar gum constituting 0.5 wt. % to 0.9 wt. % of said gluten-free dough;
        xanthan gum constituting 0.3 wt. % to 0.6 wt. % of said gluten-free dough; and
        gum Arabic constituting 0.2 wt. % to 0.5 wt. % of said gluten-free dough.

11. The method as defined in claim 10, wherein said leavening agent includes 1-6 wt. % yeast and 0.1-1.5 wt. % chemical leavener.

12. The method as defined in claim 10, wherein said gluten-free dough includes
    45-55 wt. % of said gluten-free flour;
    said leavening agent includes 2-4 wt. % yeast and 0.5-1.2 wt. % chemical leavener;
    2-3 wt. % of said modified starch;
    35-45 wt. % of said water;

3-10 wt. % of said protein; and 4-18 wt. % of said oil and/or shortening.

13. The method as defined in claim 1, wherein said gluten-free dough is free of dairy products.

14. A method of preparing a frozen par-baked or fully finished gluten-free dough product comprising the steps of:
   i) providing a gluten-free dough that includes gluten-free flour, leavening agent, modified starch, water, protein, emulsifier, shortening and/or oil, and gum;
      said gluten-free flour constituting at least 35 wt. % of said gluten-free dough;
      said leavening agent selected from the group consisting of yeast, chemical leavener, and a combination thereof; said leavening agent constituting at least 1.1 wt. % of said gluten-free dough;
      said modified starch constituting at least 1 wt. % of said gluten-free dough;
      said water constituting at least 30 wt. % of said gluten-free dough;
      said protein constituting at least 2 wt. % of said gluten-free dough;
      said emulsifier constituting at least 0.1 wt. % of said gluten-free dough;
      said shortening and/or oil constituting at least 1 wt. % of said gluten-free dough;
      said gum constituting 0.8 wt. % to 4.2 wt. % of said gluten-free dough and including
         guar gum constituting 0.3 wt. % to 1.5 wt. % of said gluten-free dough;
         xanthan gum constituting 0.3 wt. % to 1.5 wt. % of said gluten-free dough; and
         gum Arabic constituting 0.2 wt. % to 1.2 wt. % of said gluten-free dough;
   ii) dividing and shaping said gluten-free dough under conditions such that the increase in specific volume is less than 20%;
   iii) sheeting or pressing said gluten-free dough after said step of dividing and shaping;
   iv) baking said gluten-free dough to form said par-baked or fully finished gluten-free dough product, wherein said gluten-free dough product is a pizza dough, a tortilla dough, or a flatbread dough; and,
   v) freezing said par-baked or fully finished gluten-free dough product after said step of baking.

15. The method as defined in claim 14, wherein said specific volume of said gluten-free dough during and after said step of sheeting or pressing is less than 20%.

16. The method as defined in claim 14, wherein a dough temperature of said gluten-free dough during said step of dividing and shaping and the step of sheeting or pressing is no more than 80° F.

17. The method as defined in claim 14, wherein said step of dividing and shaping said gluten-free dough includes forming a portion of said gluten-free dough into a dough ball, said step of sheeting or pressing said gluten-free dough includes flattening said dough ball to form a flattened dough piece having a thickness of 4-16 mm.

18. The method as defined in claim 14, further including the step of proofing said gluten-free dough after said step of sheeting or pressing and before said step of baking.

19. The method as defined in claim 18, wherein said gluten-free dough is subjected to steaming during said step of baking.

20. A method of preparing a gluten-free dough product comprising adding water and optionally oil to a dry mix comprising:
   70-85 wt. % of a gluten-free flour;
   1-7 wt. % of yeast and/or 0.3-2.0 wt. % of a chemical leavener;
   1-5 wt. % of modified starch;
   0.3-1.5 wt. % of guar gum;
   0.3-1.5 wt. % of xanthan gum;
   0.2-1.2 wt. % of gum Arabic;
   3-20 wt. % of a protein;
   2-10 wt. % of a sweetener;
   0.05-1.2 wt. % of an emulsifier; and
   xylanase enzyme;
   wherein said gluten-free dough product is a pizza dough, a tortilla dough, or a flatbread dough.

* * * * *